US010831620B2

(12) United States Patent
Dusanapudi et al.

(10) Patent No.: US 10,831,620 B2
(45) Date of Patent: Nov. 10, 2020

(54) CORE PAIRING IN MULTICORE SYSTEMS

(71) Applicant: International Business Machines Corporation, Armonk, NY (US)

(72) Inventors: Manoj Dusanapudi, Bangalore (IN); Prasanna Jayaraman, Austin, TX (US); Rahul M. Rao, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 154 days.

(21) Appl. No.: 15/183,044

(22) Filed: Jun. 15, 2016

(65) Prior Publication Data
US 2017/0364421 A1    Dec. 21, 2017

(51) Int. Cl.
G06F 11/20 (2006.01)
G06F 12/0875 (2016.01)
G06F 9/38 (2018.01)
G06F 9/46 (2006.01)
G06F 11/07 (2006.01)

(52) U.S. Cl.
CPC .......... *G06F 11/203* (2013.01); *G06F 9/3836* (2013.01); *G06F 9/3891* (2013.01); *G06F 9/46* (2013.01); *G06F 11/0724* (2013.01); *G06F 11/2035* (2013.01); *G06F 11/2043* (2013.01); *G06F 12/0875* (2013.01); *G06F 2201/85* (2013.01)

(58) Field of Classification Search
CPC ............. G06F 11/2043; G06F 11/0724; G06F 11/2023; G06F 11/2028; G06F 11/2033
See application file for complete search history.

(56) References Cited

U.S. PATENT DOCUMENTS

| 6,651,163 | B1* | 11/2003 | Kranich | G06F 9/3004 |
| | | | | 712/220 |
| 7,117,389 | B2 | 10/2006 | Luick | |
| 8,732,368 | B1 | 5/2014 | Jouppi et al. | |
| 2009/0178052 | A1* | 7/2009 | Shen | G06F 12/0842 |
| | | | | 718/105 |
| 2012/0210162 | A1* | 8/2012 | Gara | G06F 11/1064 |
| | | | | 714/6.1 |
| 2013/0151894 | A1* | 6/2013 | Honda | G06F 11/1405 |
| | | | | 714/17 |
| 2013/0238912 | A1* | 9/2013 | Priel | G06F 1/324 |
| | | | | 713/300 |
| 2014/0089734 | A1* | 3/2014 | Busaba | G06F 11/0715 |
| | | | | 714/16 |

(Continued)

OTHER PUBLICATIONS

Chen et al., "Function Units Sharing between Neighbor Cores in CMP", C.-H. Hsu et al. (Eds.): ICA3PP 2010, Part I, LNCS 6081, pp. 136-148, 2010, © Springer-Verlag Berlin Heidelberg 2010.

(Continued)

*Primary Examiner* — Jigar P Patel
(74) *Attorney, Agent, or Firm* — Stephen R. Yoder

(57) ABSTRACT

A method, executed by a computer, includes pairing a first core with a second core to form a first core group, wherein each core of the group has a plurality of functional units, transferring instructions received by the first core to the second core for execution via a first inter-core communication bus, and executing the instructions on the second core. A computer system and computer program product corresponding to the above method are also disclosed herein.

5 Claims, 5 Drawing Sheets

(56) References Cited

U.S. PATENT DOCUMENTS

2015/0261543 A1* 9/2015 Lahteenmaki .... G06F 15/17337
712/225
2016/0283314 A1* 9/2016 Thanner .............. G06F 11/0793
2017/0177407 A1* 6/2017 Therien ................ G06F 1/3287

OTHER PUBLICATIONS

Rodrigues et al., "Performance and Power Benefits of Sharing Execution Units between a High Performance Core and a Low Power Core", 2014 27th International Conference on VLSI Design and 2014 13th International Conference on Embedded Systems, © 2014 IEEE, DOI 10.1109/VLSID.2014.42, pp. 204-209.

* cited by examiner

CORE PAIRING IN MULTICORE SYSTEMS

BACKGROUND OF THE INVENTION

The present invention relates generally to processing units, and more specifically, to pairing cores of processing units.

In the field of multi-core computing, a computing component may have multiple independent processing units known as cores. Since each core can read and execute program instructions, multi-core processors may simultaneously run multiple instructions in parallel, thus increasing processing speed. One benefit of multi-core computing is that cores can provide redundancy for other cores in order to increase processing speed overall, and to provide redundancy to the multi-core system.

SUMMARY

As disclosed herein, a method, executed by a computer, includes pairing a first core with a second core to form a core group, wherein each core of the core group has a plurality of functional units, transferring instructions received by the first core to the second core for execution via a first inter-core communication bus, and executing the instructions on the second core. A computer system and computer program product corresponding to the above method are also disclosed herein.

DETAILED DESCRIPTION

Embodiments of the present invention relate generally to processing units, and more specifically, to pairing cores of processing units. By connecting cores with an inter-core communication bus, cores may share instructions back and forth and thus act as a pair. When two or more cores are grouped together, instructions from any of the grouped cores may be directly fed into the execution units of other cores in the group. Pairing cores may not only increase computing speed of the overall multi-core system, but also enable cores to provide redundancy for each other in the case of failure.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of the invention as set forth hereinafter. The present invention will now be described in detail with reference to the figures.

Figure 1:
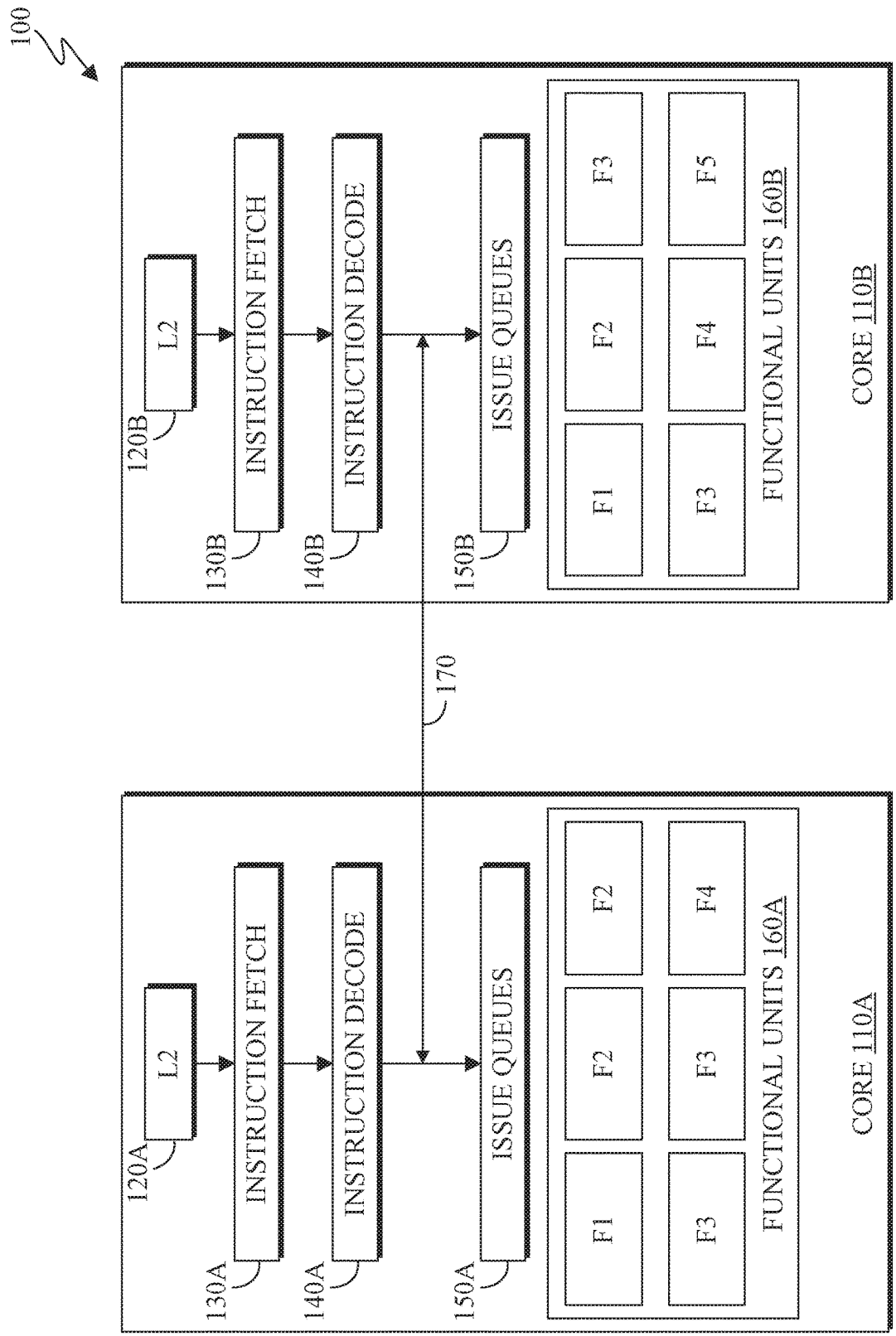
FIG. 1 is a block diagram depicting an example of a core pair system in accordance with embodiments of the present invention.

FIG. 1 is a block diagram depicting an example of a core pair system 100 in accordance with embodiments of the present invention. As depicted, core pair system 100 includes cores 110A and 110B, caches 120A and 120B, instruction fetching units 130A and 130B, instruction decoding units 140A and 140B, queue issuing units 150A and 150B, functional units 160A and 160B, and inter-core communication bus 170. Cores 110A and 110B may share instructions via inter-core communication bus 170 prior to execution by functional units belonging to functional unit groups 160A and/or 160B.

Cores 110A and 110B may be responsible for receiving and executing instructions. Received instructions may be stored on each core's cache, such as cache 120A and 120B. Cache 120A and 120B may be used by each core 110A and 110B as a small, fast memory units that stores copies of data from frequently used main memory locations. In some embodiments, cache 120A and 120B are L2 caches. Caches 120A and 120B may be instruction caches.

Instruction fetching units 130A and 130B may be responsible for fetching instructions from cache 120A and 120B respectively. Once fetched, instruction fetch units 130A and 130B pass instructions to their respective instruction decode units 140A and 140B. Instruction decode units may decode the instructions into a form that is executable by a functional unit. In some embodiments, the decoding process allows the processing unit to determine what instruction is to be performed, so that the processing unit can tell how many operands it needs to fetch in order to perform the instructions.

Queue issuing units 150A and 150B may be responsible for issuing instruction queues to the appropriate functional units for execution. For example, queue issuing unit 150A may determine that instructions should be executed by a particular functional unit based on the type of instructions. When multiple instructions of the same type are encountered, queue issuing units 150A and 150B may determine which of the functional units corresponding to the type of instructions will execute particular instructions.

Functional units groups 160A and 160B may collectively refer to all of the functional units of a core. As depicted, core 110A has one functional unit F1, two F2 units, two F3 units, and one F4 unit, whereas core 110B has one functional unit F1, one F2, two F3 units, and one F4 and an F5 unit that core 110A lacks. Thus, core 110A and 110B need not necessarily be homogenous in terms of functional units in order to be paired. Each functional unit may be associated with certain types of instructions.

Inter-core communication bus 170 may be a bus that enables instructions to be transferred between cores 110A and 110B after the decoding phase, but before being queued for execution by a functional unit. For example, since core 110A is paired with core 110B, instructions fetched from cache 120A may be transferred via inter-core communication bus 170 to queue issuing unit 150B, and ultimately executed on one or more of the functional units of functional unit group 160B. In some embodiments, inter-core communication bus 170 is a multi-lane two way communication bus driven by tri-stated drivers. The purpose of the two way communication may be to transfer instructions in one direction while transferring execution status (or completion status with results) in the other direction.

In some embodiments, inter-core communication bus 170 is positioned immediately after instruction fetching units 130A and 130B rather than, or in addition to being positioned immediately after instruction decoding units 140A and 140B. Thus, in the case of a fault in instruction decoding unit 140A or 140B, instructions may be fetched from a one core and transferred over to the other core and back as necessary.

Figure 2:
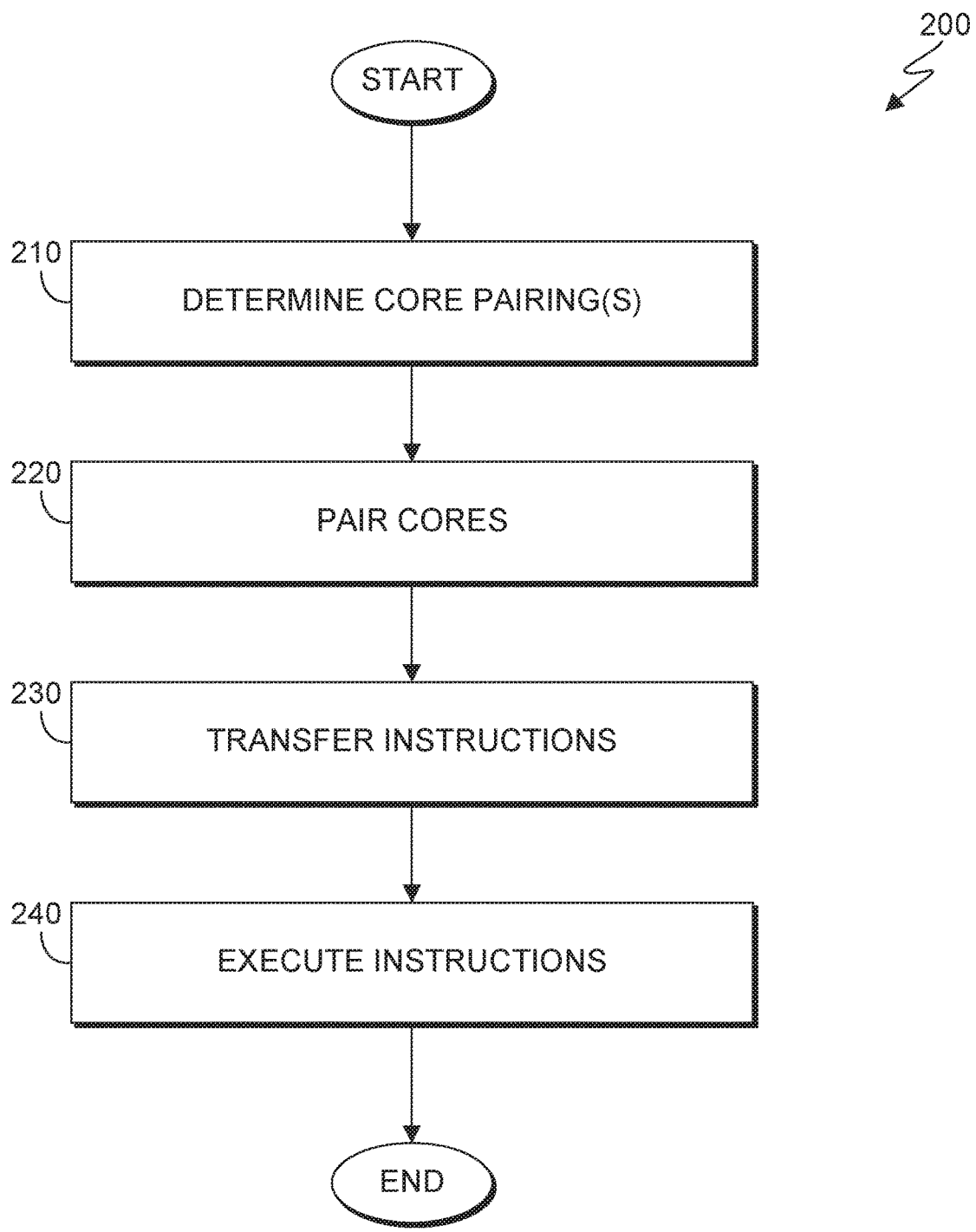
FIG. 2 is a flow chart depicting an example of a core pairing method in accordance with embodiments of the present invention.

FIG. 2 is a flow chart depicting an example of a core pairing method 200 in accordance with embodiments of the present invention. As depicted, core pairing method 200 includes determining (210) core pairing(s), pairing (220) cores, transferring (230) instructions, and executing (240) instructions. While the term "pair" is used, core pairing method 200 may pair two cores to the same third core, so core pairing method 200 may create oddly-numbered systems.

Determining (210) core pairing(s) may include determining which particular cores of a multi-core system to pair. In some embodiments, the pairing is predetermined at boot time. The pairing may be set by a user. In some embodiments, core pairing occurs dynamically in response to system considerations, such as passing a threshold of resource utilization, core temperatures exceeding a threshold, core utilization exceeding a threshold, and the like. Cores may be paired in response to a core's failure of one or more of its functional units.

Pairing (220) cores may include pairing cores that were selected during core pairing determination operation 210. Cores may be paired via an inter-core communication bus, which enables a core to pass instructions to any core with which it is paired. In some embodiments, a core may pair with two or more cores to form a group; any core that is a member of the group may pass instructions to any other member core. Multiple cores or core pairs may be grouped together to form a core cluster in which inter-core connection buses facilitate transfer of instructions between any two cores in the cluster.

Transferring (230) instructions may include transferring instructions from a core, such as core 110A, to its paired core, such as core 110B, via inter-core communication bus 170. Instructions may be transferred in response to determining that a core's power utilization, temperate, and/or frequency has surpassed a threshold. Thus, instructions can be offloaded from a core to its paired core in order to avoid overtaxing the core. Instructions may also be transferred due to critical path considerations. For example, if a critical path of execution would require that instructions be split and partially executed on multiple cores, then the instructions can be passed to each core according to the critical path and executed accordingly in order to reduce stress on any particular core. Instruction transfer without instruction split may also occur when all execution units of a particular type on a particular core are busy, while execution units of the same type are free on the paired core. Thus, transferring instructions to the paired core may enable faster instruction execution.

Executing (240) instructions may include sending the transferred instructions to one or more of the functional units for execution. For example, instructions transferred from core 110A to core 110B may be processed by queue issuing unit 150B and executed by one or more of the functional units of functional unit group 160B. In some embodiments, executing instructions on both cores as a pair enables the pair of cores to execute more than one set of instructions per cycle. Paired cores may execute 1.5 or more instructions per cycle. Paired cores may not execute a fully combined 2.0 instructions per cycle due to having to transfer instructions across the inter-core communication bus.

Figure 3:
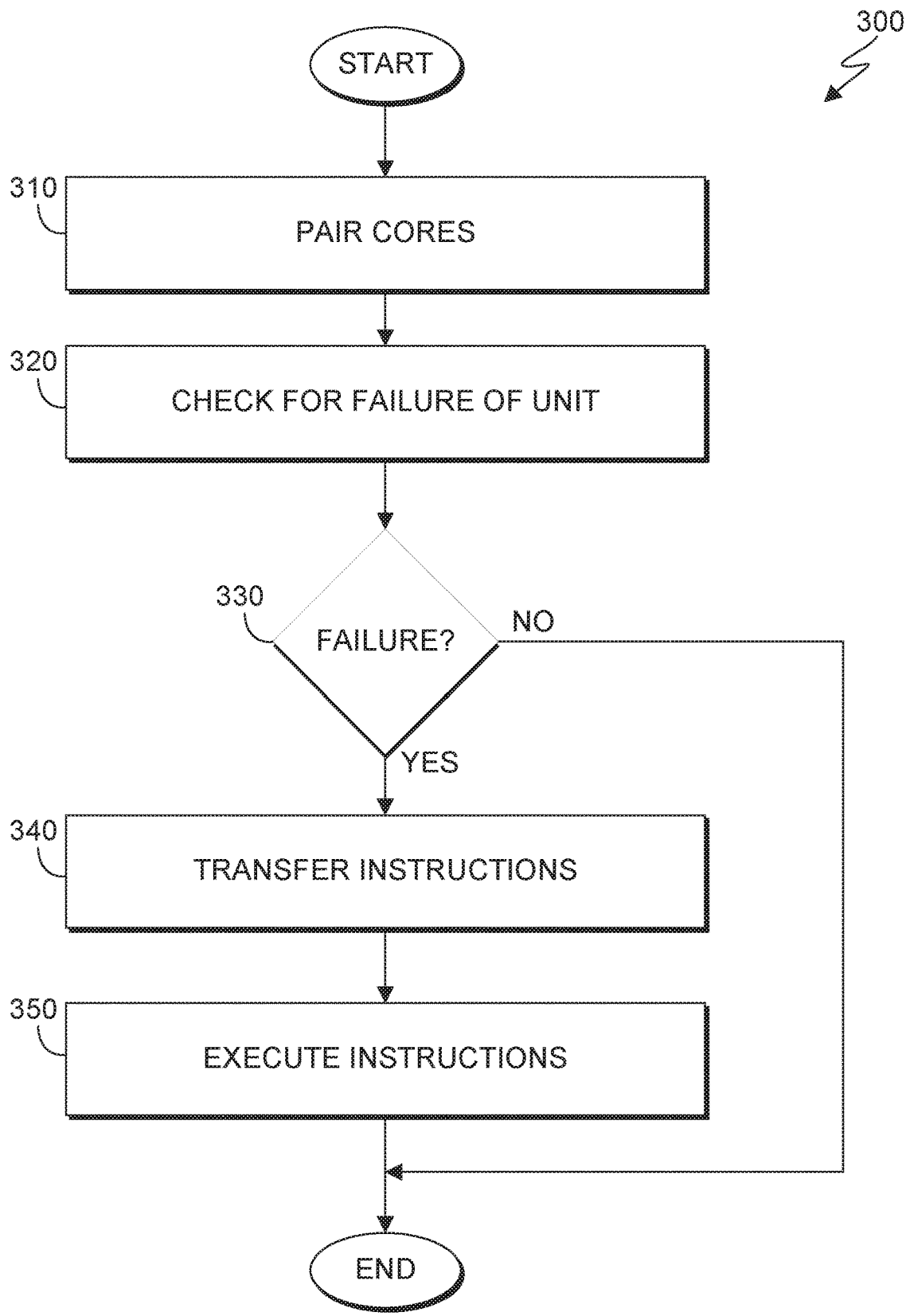
FIG. 3 is a flow chart depicting an example of a unit failure response method in accordance with embodiments of the present invention.

FIG. 3 is a flow chart depicting an example of a unit failure response method 300 in accordance with embodiments of the present invention. As depicted, unit failure response method 300 includes pairing (310) cores, checking (320) for unit failure, determining (330) whether there is a failure, transferring (340) instructions, and executing (350) instructions. Unit failure response method 300 may shift instructions from one core to another in response to a failure of the core's functional unit.

Pairing (310) cores may include determining which cores to pair, and connecting via an inter-core communication bus. In some embodiments, a core may pair with two or more cores to form a group; any core that is a member of the group may pass instructions to any other member core.

Checking (320) for failure may include checking the functional units for failure. Functional units may be checked for failure by any means available that would be known to a person having skill in the art, such as by architecture-validation programs run on the core during testing, which may test the various components. Furthermore, built-in self-testing may be carried out by using directed patterns, or pseudo-random number generators. When unit failure response method 300 determines (330) that one or more functional units has failed, method 300 proceeds to instruction transfer operation 340; otherwise, unit failure response method 300 terminates.

Transferring (340) instructions may include sending the instructions from the core whose functional unit has failed to a paired core whose analogous functional unit has not failed. Instructions may be transferred via an inter-core communication bus. For example, if there are instructions queued for execution on core 110A's VMX execution unit, and the VMX execution unit has failed, then the instructions will be sent to core 110B via inter-core communication bus 170 and executed on core 110B's analogous functional unit, the VMX execution unit that is a member of functional unit group 160B. Executing (350) the instructions may include using the appropriate functional unit to stand in as a replacement for the failed functional unit and execute the instructions on its behalf.

Figure 4:
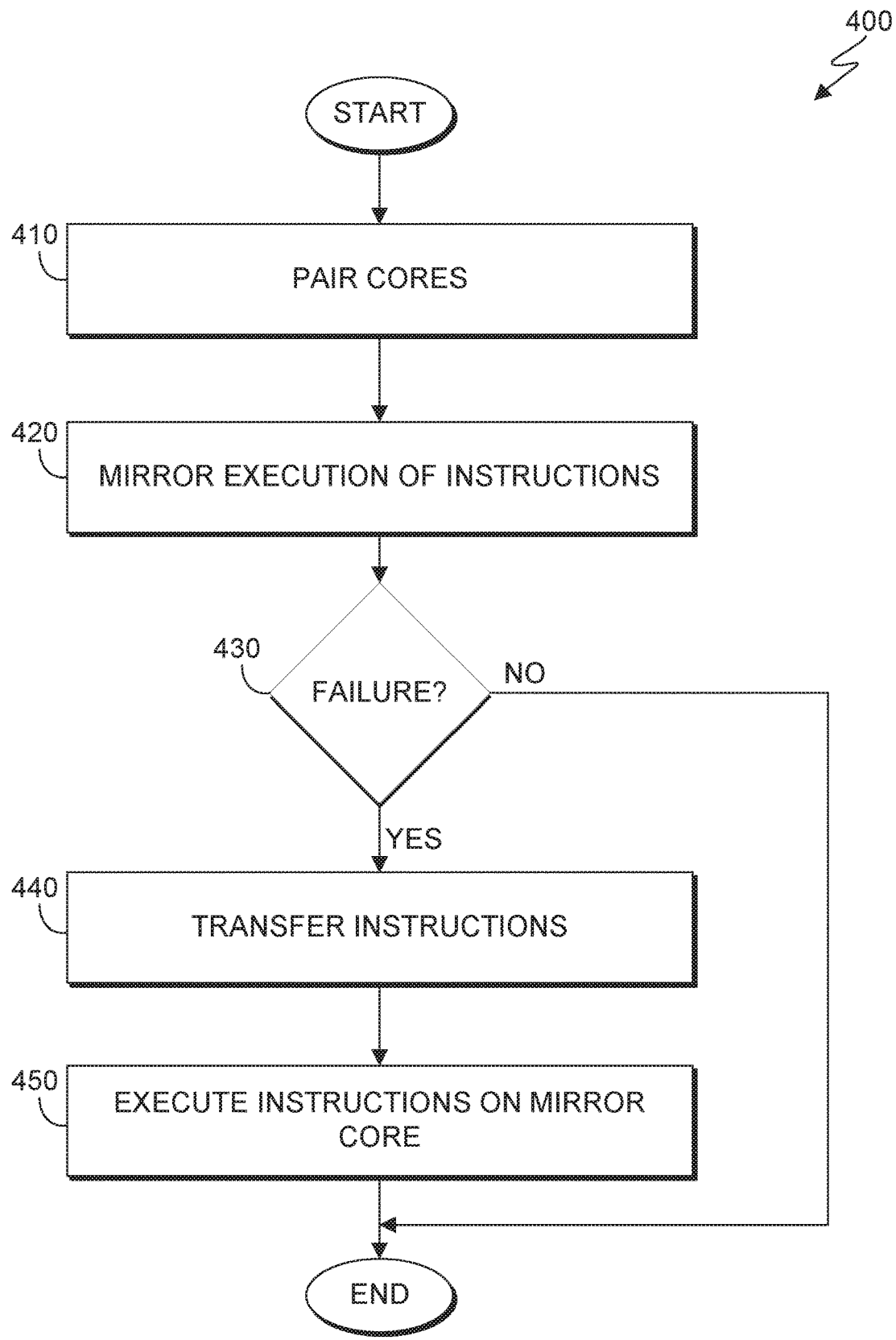
FIG. 4 is a flow chart depicting an example of a core mirroring method in accordance with embodiments of the present invention.

FIG. 4 is a flow chart depicting an example of a core mirroring method 400 in accordance with embodiments of the present invention. As depicted, core mirroring method 400 includes pairing (410) cores, mirroring (420) execution, determining (430) whether there is a failure, transferring (430) instructions, and executing (450) instructions.

Pairing (410) cores may include determining which cores to pair, and connecting via an inter-core communication bus. In some embodiments, a core may pair with two or more cores to form a group; any core that is a member of the group may pass instructions to any other member core. One of the cores may be considered an active core, and the other core may be a mirror core.

Mirroring (420) execution of instructions may include mirroring the execution of instructions of the active core on the mirror core. In some embodiments, the mirror core draws runs at a lower power and/or frequency than the active core. Cross-check logic may be implemented such that the output of the mirror core and active core can be compared.

Determining (430) that there is a failure may include detecting a die failure based on comparing the output of the active core and the mirror core. If the output does not substantially match, then the active core may have a die failure. In response to determining (430) that there is a failure, the core mirroring method 400 proceeds to the instructions transfer operation 440; otherwise, the method terminates.

Transferring (440) instructions may include transferring instructions designated for execution on the active core to the mirror core. The mirror core may stand in as a partial or full replacement for the active core, depending on the extent of the failure. Executing (450) instructions may include executing the instructions on the mirror core. In some embodiments, when the mirror core takes over execution tasks for the active core, the mirror core increases its power consumption and/or frequency.

Figure 5:
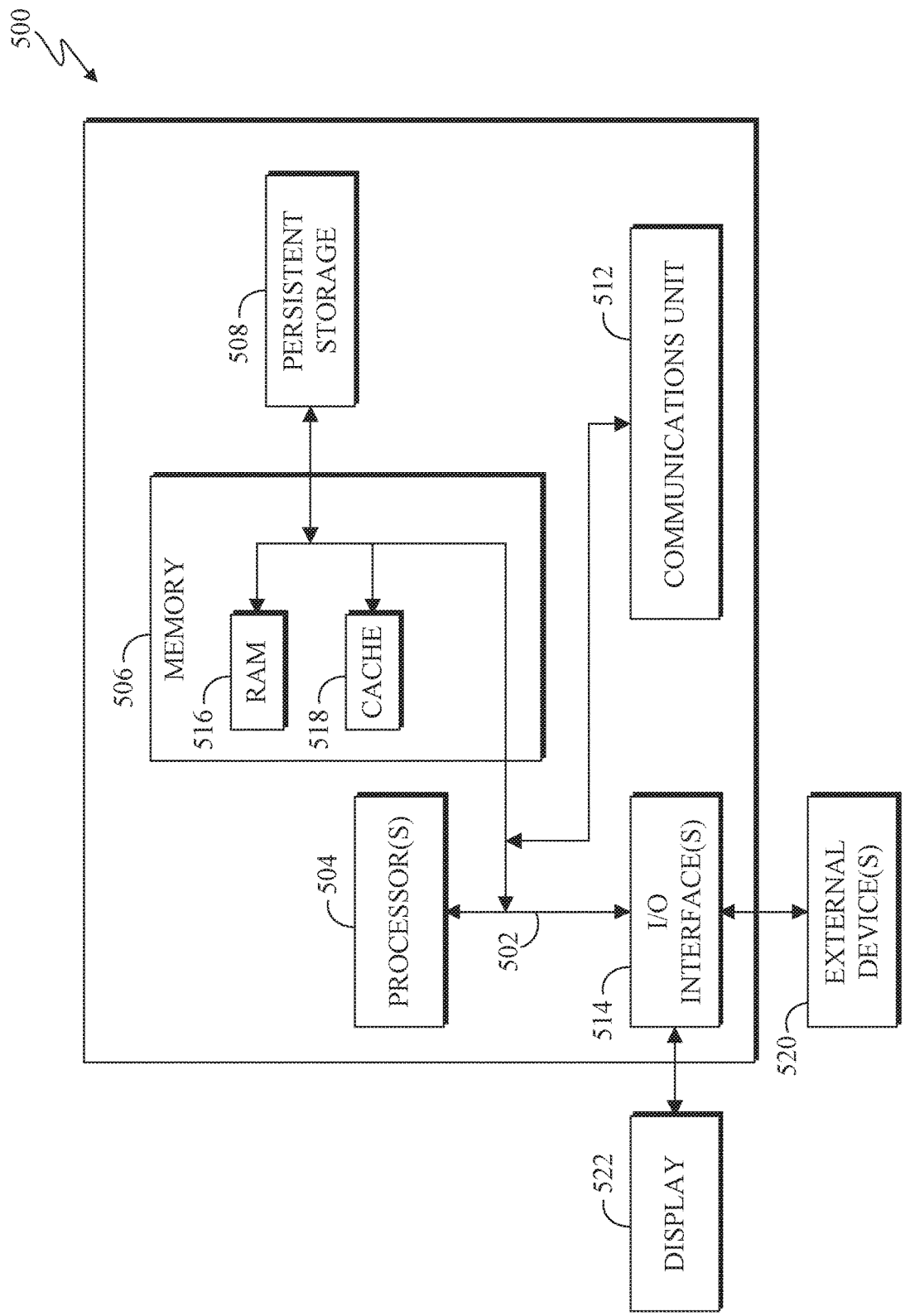
FIG. 5 is a block diagram depicting one example of a computing apparatus (i.e., computer) suitable for executing the methods disclosed herein.

FIG. 5 is a block diagram depicting components of a computer 500 suitable for executing the methods disclosed herein. It should be appreciated that FIG. 5 provides only an illustration of one embodiment and does not imply any limitations with regard to the environments in which different embodiments may be implemented. Many modifications to the depicted environment may be made.

As depicted, the computer 500 includes communications fabric 502, which provides communications between computer processor(s) 504, memory 506, persistent storage 508, communications unit 512, and input/output (I/O) interface(s) 514. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In the depicted embodiment, memory 506 includes random access memory (RAM) 516 and cache memory 518. In general, memory 506 can include any suitable volatile or non-volatile computer readable storage media.

One or more programs may be stored in persistent storage 508 for execution by one or more of the respective computer processors 504 via one or more memories of memory 506. The persistent storage 508 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 512, in these examples, provides for communications with other data processing systems or devices. In these examples, communications unit 512 includes one or more network interface cards. Communications unit 512 may provide communications through the use of either or both physical and wireless communications links.

I/O interface(s) 514 allows for input and output of data with other devices that may be connected to computer 500. For example, I/O interface 514 may provide a connection to external devices 520 such as a keyboard, keypad, a touch screen, and/or some other suitable input device. External devices 520 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 508 via I/O interface(s) 514. I/O interface(s) 514 may also connect to a display 522. Display 522 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
  receiving, from an instruction cache of a first core of a processor and by a fetching unit of the first core, a set of undecoded instruction(s);
  passing, by the fetching unit and to a decode unit of the first core, the set of undecoded instruction(s);
  decoding, by the decode unit, the set of undecoded instruction(s) to obtain a set of decoded instruction(s), with the set of decoded instructions being in a form that is executable by the processor;
  determining, by the decode unit, that a first decoded instruction(s) sub-set of the set of decoded instruction(s) is to be executed;
  determining, by the decode unit, that a second decoded instruction(s) sub-set of the set of decoded instruction(s) is to be executed;
  determining that a first critical path of execution requirement has been met, with the first critical path of execution requirement being that the first decoded instruction(s) sub-set and the second decoded instruction(s) sub-set are to be executed on separate cores of the processor;
  determining, by a set of queue issuing unit(s), that the first decoded instruction(s) sub-set should be transferred from the first core of the processor to a second core of the processor based, at least in part, upon the first critical path of execution requirement being met;
  responsive to the determination that the first decoded instruction(s) sub-set should be transferred from the first core to the second core, transferring, by the set of queue issuing unit(s), the first decoded instruction(s) sub-set from the first core to a set of functional unit(s) of the second core;
  determining that a first portion of the first decoded instruction(s) sub-set can be executed by the set of functional unit(s) of the second core;
  executing the first portion of the first decoded instruction(s) sub-set by the set of functional unit(s) of the second core;
  determining that the set of functional unit(s) of the second core have reached a maximum execution capacity, with the maximum execution capacity being an upper limit of an amount of decoded instruction(s) that the set of functional unit(s) can execute at a given time;

responsive to the determination that the set of functional unit(s) of the second core have reached the maximum execution capacity, transferring, by the set of queue issuing unit(s), a remainder portion of the first decoded instruction(s) sub-set from the second core to the first core; and responsive to transfer of the remainder portion of the first decoded instruction(s) sub-set, queuing the remainder portion of the first decoded instruction(s) sub-set for execution by the set of functional unit(s) of the first core so that the remainder portion of the first decoded instruction(s) sub-set can be executed at a point in time after the execution of the first portion of the first decoded instruction(s);

wherein:

the first decoded instruction(s) sub-set is entirely made up of the first portion and the remainder portion, the first portion being distinct from the remainder portion; and the first core and the second core are both included in the same processor.

2. The method of claim 1 wherein the first decoded instruction(s) sub-set is transferred from the first core to the second core by an inter-core communication bus, with the inter-core communication bus being included in the same processor that includes the first core and the second core.

3. The method of claim 1 wherein the first decoded instruction(s) sub-set is transferred from the first core to the second core in order to avoid overtaxing the first core.

4. The method of claim 2 wherein the inter-core communication bus is structured, located and connected to provide two way communication as follows: (i) transfer instructions from the first core to the second core, and (ii) transfer execution status from the second core to the first core.

5. The method of claim 1 further comprising:

determining, by the set of queue issuing unit(s), that the second decoded instruction(s) sub-set should remain on the first core of the processor based, at least in part, upon the first critical path of execution requirement;

responsive to the determination that the second decoded instruction(s) sub-set should remain on the first core of the processor, executing the second decoded instruction(s) sub-set by the set of functional unit(s) of the first core; and executing the remainder portion by the set of functional unit(s) of the first core.

\* \* \* \* \*